United States Patent
Specht

(10) Patent No.: US 8,599,936 B2
(45) Date of Patent: Dec. 3, 2013

(54) CODE VIOLATION GENERATOR AND METHODS OF GENERATING CODE VIOLATIONS

(75) Inventor: Philip Specht, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2044 days.

(21) Appl. No.: 11/704,751

(22) Filed: Feb. 9, 2007

(65) Prior Publication Data

US 2008/0056453 A1 Mar. 6, 2008

Related U.S. Application Data

(60) Provisional application No. 60/841,167, filed on Aug. 30, 2006.

(51) Int. Cl.
*H04B 3/00* (2006.01)
*H04L 25/00* (2006.01)

(52) U.S. Cl.
USPC .......................................... 375/257; 375/222

(58) Field of Classification Search
USPC .......................................................... 375/257
See application file for complete search history.

(56) References Cited

U.S. PATENT DOCUMENTS

| | | | | |
|---|---|---|---|---|
| 4,815,106 A * | 3/1989 | Propp et al. | | 375/257 |
| 6,266,348 B1 * | 7/2001 | Gross et al. | | 370/493 |
| 7,624,314 B1 * | 11/2009 | Chu | | 714/712 |
| 2002/0027984 A1 * | 3/2002 | Elo | | 379/377 |
| 2002/0181404 A1 * | 12/2002 | Insler et al. | | 370/241 |
| 2003/0048756 A1 * | 3/2003 | Chang et al. | | 370/252 |
| 2003/0101020 A1 * | 5/2003 | Matsushige | | 702/185 |
| 2004/0085987 A1 * | 5/2004 | Gross et al. | | 370/430 |
| 2004/0105465 A1 * | 6/2004 | Gross et al. | | 370/480 |
| 2005/0254562 A1 * | 11/2005 | Jani et al. | | 375/222 |
| 2005/0286184 A1 * | 12/2005 | Campolo | | 361/42 |
| 2007/0113162 A1 * | 5/2007 | Lery | | 714/800 |
| 2007/0160299 A1 * | 7/2007 | Kajiwara et al. | | 382/240 |
| 2007/0166038 A1 * | 7/2007 | Yano | | 398/79 |
| 2008/0049369 A1 * | 2/2008 | Bremond et al. | | 361/119 |
| 2008/0056453 A1 | 3/2008 | Specht | | |
| 2009/0323788 A1 * | 12/2009 | Gross et al. | | 375/222 |
| 2011/0110409 A1 * | 5/2011 | Sands et al. | | 375/222 |

* cited by examiner

*Primary Examiner* — Erin File
(74) *Attorney, Agent, or Firm* — Myers Bigel Sibley & Sajovec, P.A.

(57) ABSTRACT

Methods of generating coding errors on a communication line include changing a phase and/or an amplitude of a communication signal on the communication line. An apparatus for generating coding errors on a communication line including first and second parallel conductors includes a modulator configured to change a phase and/or an amplitude of a communication signal on the communication line in response to a control signal, and an oscillator configured to generate the control signal.

15 Claims, 2 Drawing Sheets

CODE VIOLATION GENERATOR AND METHODS OF GENERATING CODE VIOLATIONS

CROSS REFERENCE TO RELATED APPLICATION

The present application claims the benefit of and priority to U.S. Provisional Patent Application No. 60/841,167, filed Aug. 30, 2006, entitled "CODE VIOLATION GENERATOR AND METHODS OF GENERATING CODE VIOLATIONS," the disclosure of which is hereby incorporated herein by reference in its entirety.

FIELD OF THE INVENTION

The present invention relates to electronic communications systems. More particularly, the present invention relates to methods and apparatus for testing communication equipment in a digital communications system.

BACKGROUND

Conventional telephone networks, such as the Public Switched Telephone Network (PSTN), were initially designed to carry low bandwidth, analog voice communication signals. While the human ear can distinguish audio signals having a frequency as high as 20 kHz, the PSTN was designed to carry audio signals between 300 and 3.4 kHz, which is considered to be sufficient to permit a listener to both understand a voice and to recognize the speaker. At the central office of a telephone network, the analog voice signal is generally digitized into an 8-bit signal at a sampling rate of 8 kHz to provide a 64 kbit/s data stream. Thus, according to the Nyquist theorem, any components of the voice signal above 4 kHz may not be faithfully transmitted by the phone network. In fact, signal components above 4 KHz are filtered out of the voice signal in order to reduce problems such as aliasing.

The local loop between a PSTN central office and a subscriber terminal typically uses twisted-pair wiring, which is capable of carrying voice signals over reasonable distances. In fact, twisted-pair wiring is capable of carrying frequencies well above those required for analog voice communications. Depending on the length and/or quality of the loop wiring, signals having a bandwidth in the tens of megahertz may be carried for short distances over the local loop wiring.

Recently, there has been an expansion of demand for high-speed data communications services, such as broadband internet access, for residential and business subscribers. Digital Subscriber Line (DSL) technology has been developed to provide such data communications services. DSL refers to a family of technologies that provide high speed digital data transmission over conventional telephone wires, such as the twisted-pair wiring of a local telephone network. DSL takes advantage of the unused bandwidth of the local loop by defining a plurality of 4312.5 Hz wide channels starting between 10 and 100 kHz, depending on how the system is configured. The number of channels used depends on the particular implementation of DSL. Each channel may be evaluated for usability. Thus, more usable channels results in more available bandwidth. The pool of usable channels is allocated between upstream and downstream traffic based on system design requirements.

At the central office or at a neighborhood Serving Area Interface (SAI), a Digital Subscriber Line Access Multiplexer (DSLAM) receives DSL signals from multiple subscriber DSL connections. The DSLAM multiplexes the signals onto a high-speed backbone line.

Customers connect to the DSLAM through DSL modems or DSL routers, which are connected to the PSTN network via unshielded twisted-pair telephone lines. A DSLAM may have multiple aggregation cards, each of which may have multiple ports to which subscriber lines are connected. A single DSLAM aggregation card typically has 24 ports. A typical DSLAM may have, in total, up to 192 or more DSL ports.

The quality of the DSL link to the DSLAM may have a direct impact on the number of usable DSL channels available to a subscriber; and thus may directly affect the bandwidth available to a particular subscriber. Thus, it is important for service providers to be able to accurately and reliably identify, report, and respond to errors on a DSL line. Line errors may result in signal corruption that is sometimes referred to as a "code violation." A code violation may result in an unrecoverable error in a frame of data sent over a DSL line.

SUMMARY

Methods of generating coding errors on a communication line according to some embodiments of the invention include changing a phase and/or an amplitude of a communication signal on the communication line. The methods may further include generating the communication signal, and transmitting the communication signal on the communication line.

The communication line may include first and second parallel conductors, and changing a phase and/or an amplitude of the communication signal carried on the communication line may include capacitively coupling the first and second parallel conductors of the communication line.

Capacitively coupling the first and second parallel conductors of the communication line may include providing a shunt connection including a capacitor and a switch between the first and second parallel conductors and selectively closing the switch to electrically connect a first terminal of the capacitor with the first parallel conductor and a second terminal of the capacitor with the second parallel conductor.

The switch may include a control input configured to controllably close and/or open the switch upon application of a control signal thereto, and selectively closing the switch may include generating an oscillating signal and applying the oscillating signal as a control signal to the control input.

Generating the oscillating signal may include generating a pulse train. The pulse train may have a pulse period of about one second or more. Furthermore, a pulse in the pulse train may have a pulse width of from about 100 μsec to about 1 msec.

The communication line may include a twisted pair communication line, a coaxial communication line, an Ethernet cable, and/or a broadband power line. The communication signal may include an Ethernet signal, a DSL signal, a video signal, a voice signal, an HF carrier signal, and/or a T-carrier signal.

The communication line may include an wireless communication line and the communication signal may include an wireless communication signal, the method may further include converting the wireless communication signal to an electrical signal, changing a phase and/or an amplitude of the electrical signal to provide an altered electrical signal, and converting the altered electrical signal into an altered wireless communication signal. The wireless communication signal may include and RF communication signal and/or an optical communication signal.

Changing the phase and/or the amplitude of the communication signal on the communication line is performed without adding substantial external noise to the communication signal.

Some embodiments of the invention provide an apparatus for generating coding errors on a communication line including first and second parallel conductors. The apparatus includes a modulator configured to change a phase and/or an amplitude of a communication signal on the communication line in response to a control signal, and an oscillator configured to generate the control signal.

The modulator may include a bilateral switch and a capacitor coupled between the first and second parallel conductors, and the oscillator may include a pulse generator configured to generate a pulse train as the control signal.

The capacitor may include a first capacitor coupled to the first parallel conductor and the bilateral switch, the apparatus may further include a second capacitor coupled between the bilateral switch and the second parallel conductor. The first and second capacitors include a series capacitance selected to affect a frequency in the communication signal when the bilateral switch is closed.

The pulse generator may include a first timing circuit configured to determine a frequency of the pulse train and a second timing circuit configured to determine a pulse width of the pulse train.

An apparatus for generating coding errors on a plurality of communication lines including first and second parallel conductors according to further embodiments of the invention includes a plurality of modulators configured to change a phase and/or an amplitude of communication signals on respective ones of the plurality of communication lines in response to a control signal, and an oscillator configured to generate the control signal. Each of the modulators may include a first capacitor coupled to the first parallel conductor of one of the plurality of communication lines and a bilateral switch, and a second capacitor coupled between the bilateral switch and the second parallel conductor of the one of the plurality of communication lines, and the oscillator may include a pulse generator coupled to a control input of the bilateral switch of each of the plurality of modulators.

Other apparatus and/or methods according to embodiments of the invention will be or become apparent to one with skill in the art upon review of the following drawings and detailed description. It is intended that all such additional apparatus and/or methods be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
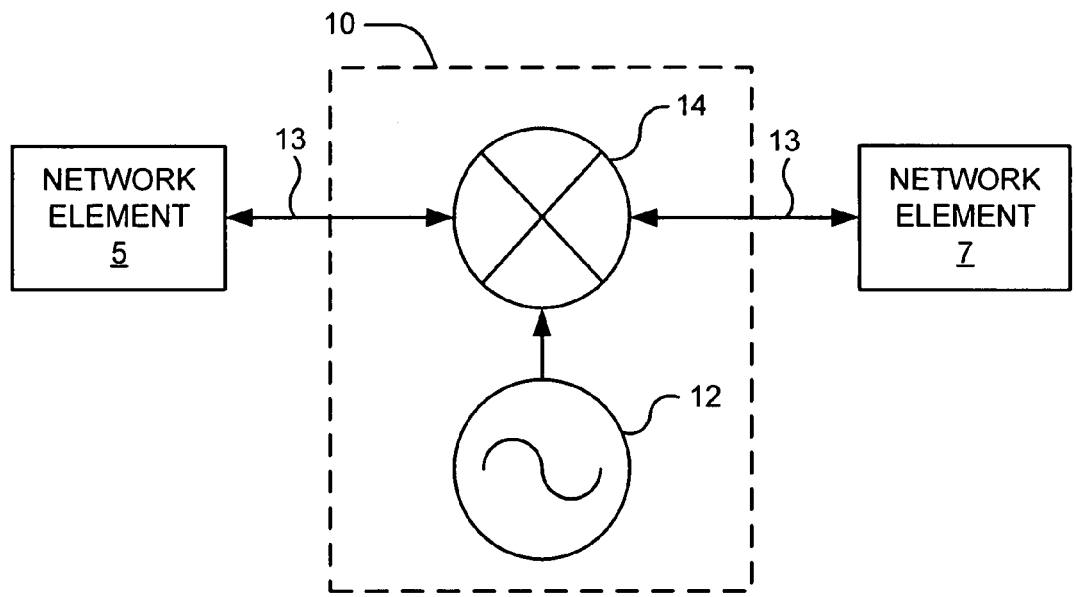
FIGS. 1 and 2 are block diagrams illustrating methods and/or apparatus for generating code violations according to some embodiments of the invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

It will also be understood that when a network element is referred to as being "connected" or "coupled" to another network element, it can be directly connected or coupled to the other element or intervening elements may be present. In contrast, when an element is referred to as being "directly connected" or "directly coupled" to another element, there are no intervening elements present.

In order to test DSL network equipment, such as a DSLAM or DSL modem or router, it is desirable to generate code violations on a DSL line served by the network element to see if the network element accurately identifies, reports and/or handles the code violation. Conventionally, code violations are generated by generating large amounts of noise on a line adjacent to the line being tested. Crosstalk from the adjacent lines generates a code violation in the line under test. "Crosstalk" refers to the coupling of electromagnetic energy from one wire loop to another. Typically, crosstalk may occur between adjacent wire pairs in a cable bundle.

In general, a developer or tester may spend a large amount of time configuring profiles required to meet the needs of a particular test. Furthermore, if high levels of noise are necessary to create code violations, crosstalk and/or unwanted noise on adjacent circuits (other than the circuits under test) may occur.

Generating high levels of noise, either spikes or impulses, at various frequencies may be effective, but may require a large amount of time to configure the noise generator in order to produce a noise signal that will generate a coding error. The particular configuration of the line being tested, including cable lengths, losses, signal to noise conditions, etc., may affect the kind of noise that may be required to create code violations.

Software simulators have also been used to generated coding errors. However, software simulators may not fully test the code violation process. Rather, they generate a simulation of an alarm that does not originate from the network element.

In contrast to conventional approaches, some embodiments of the present invention generate coding errors on a DSL line by changing the phase and/or amplitude of DSL signals on a line under test without adding high levels of external noise that may cause interference to adjacent circuitry. Furthermore, some embodiments of the invention may generate code violations without requiring extensive customizations to account for the particular configuration of the line under test.

Some embodiments of the present invention arise from a realization that a change of phase or amplitude of a DSL signal may produce a desired code violation. Signal processing in a network element, such as a DSLAM or DSL modem, may make the network element more sensitive to changes in phase or amplitude than to high intensity noise spikes that are conventionally used to test DSL equipment.

Accordingly, some embodiments of the invention may create frequency shifts, delays and/or changes in signal amplitude of a DSL signal in order to generate code violations. One way of generating such code violations according to some embodiments of the invention is to use a pulsing circuit that drives a modulator, as illustrated in FIG. 1. By regenerating the DSL signals, an appropriate part of the frequency spectrum may be acted on to produce upstream and/or downstream signal impairments (code violations).

Referring to FIG. 1, an apparatus 10 for generating code violations according to some embodiments of the invention is illustrated. The apparatus 10 may be placed on a DSL line 13 between a first network element 5, such as a DSLAM 15 (FIG. 2), and a second network element 7, such as a DSL modem/router 17 (FIG. 2), for example. The apparatus 10 includes a modulator 14 that modulates the upstream and/or downstream DSL signal in response to a control signal provided by an oscillator 12.

The frequency of pulses generated by the oscillator 12 may be selected so as not to cause the DSL modem/router 17 to reset. In general, a DSL modem/router 17 may reset if it experiences a severely errored second (SES), which may be defined as a one-second period that contains more than 30% errored blocks or at least one severely disturbed period. A severely disturbed period may be defined to occur when, over a period of time equivalent to 1 ms, all the contiguous blocks are affected by a high bit error density. Most DSL modems reset upon reaching a certain number of Severely Errored Seconds (SES). Some modems, including the Westell 6100 series, may reset upon receiving only one SES. Thus, if the frequency of violations occurs more often than once per second, the violation counts might not increment beyond one if the modem resets. Modem resets may cause active performance monitoring counters to be cleared; thus, it may not be desirable to generate more violations than the modem circuitry can tolerate. The oscillator 12 may therefore be configured to generate pulses at a rate of less than one per second, but often enough so as to accumulate enough violations to reach a desired reporting threshold. In some embodiments, at least one violation may be generated in about a fifteen minute time period. Once these thresholds are reached, Threshold Crossing Alerts (TCAs) should be generated at the network elements.

According to some embodiments of the invention, a signal impairment is created in order to generate code violations. In some embodiments, the DSL signal may be interrupted altogether using a relay to open the circuit for a fraction of a second. However, this approach may be undesirable because the un-terminated signal levels may, in some instances, be high enough to cause crosstalk in adjacent circuits, and may also cause impairments in the voice portion of the circuit. Similarly, shorting a DSL line for a fraction of a second may cause code violations. However, this may also be undesirable, because it may interfere with the voice portion of the circuit.

Figure 2:
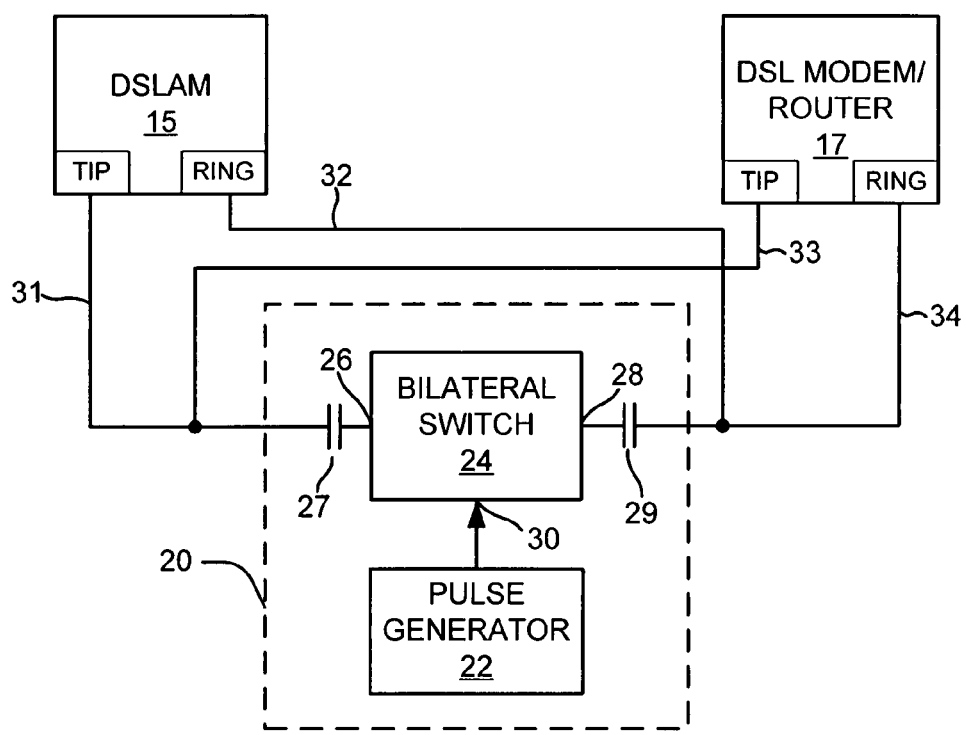

According to some embodiments of the invention, code violations may be generated by shaping a portion of the spectrum that may only affect the DSL signals. According to some embodiments of the invention, a code violation generator includes a circuit having enough capacitive coupling to only affect the DSL signals. Referring to FIG. 2, a circuit 20 for generating code violations includes a bilateral switch 24 having a first I/O port 26 and a second I/O port 28. The bilateral switch 24 is used as a modulator for signals passing between network elements such as a DSLAM 15, and a DSL modem or router 17.

The bilateral switch 24 is driven by a pulse generator 22, which is coupled to a control input 30 of the bilateral switch 24. The bilateral switch 24 is capacitively coupled to the DSL line in question through first and second coupling capacitors 27, 29. As shown in FIG. 2, the Tip line 31 from the DSLAM 15 and the Tip line 33 from the DSL modem/router 17 are connected to the first I/O port 26 of the bilateral switch 24 through the first coupling capacitor 27, while the Ring line 32 of the DSLAM 15 and the Ring line 34 of the DSL modem/router 17 are connected to the second I/O port 28 of the bilateral switch 24 through the second coupling capacitor 29. Accordingly, the Tip and Ring lines of the cable pair in question are capacitively coupled through the bilateral switch 24 as shown in FIG. 2 when the bilateral switch 24 is activated by a pulse applied to the control input 30 thereof from the pulse generator 22.

This momentary capacitive coupling between the Tip and Ring lines of the cable pair in question may disturb the phase and/or amplitude of high frequency DSL signals traveling on the cable pair, which may result in code violations being detected at the DSLAM 15 and/or the DSL modem/router 17.

By using capacitive coupling, DC signal components and lower voice frequencies on the cable pair may be unaffected by operation of the apparatus 10. The capacitances of the first and second coupling capacitors 27, 29 may be selected depending on the frequency of signals that are desired to be affected. Capacitive coupling may also protect the bilateral switch 24 from the higher AC and/or DC voltages found on the PSTN cabling. It will be appreciated that one or more relays may be used in place of the bilateral switch 24. However, relay contacts may be more difficult to control with precision.

The bilateral switch 24 may be implemented, for example, using a CD4066 Bilateral Switch from Fairchild Semiconductor. In general, the signal path between the first I/O port 26 and the second I/O port 28 is closed when a logic HIGH voltage signal is applied to the control input 30 and is open when a logic LOW voltage signal is applied to the control input 30.

Figure 3:
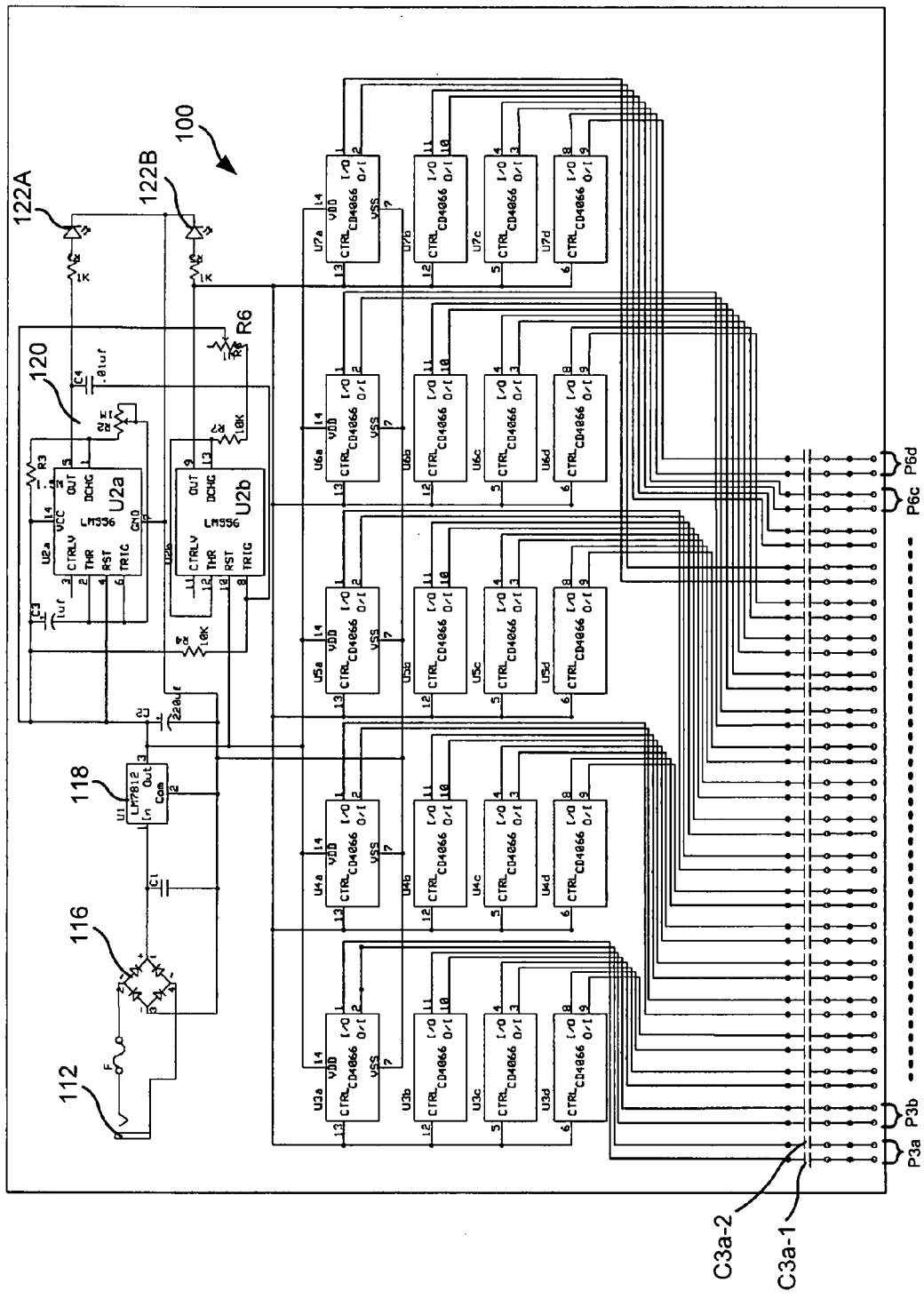
FIG. 3 is a circuit diagram of a circuit for generating code violations according to some embodiments of the invention.

A multi-line code violation generator 100 is illustrated in FIG. 3. The multi-line code violation generator includes 20 bilateral switches U3a-U3d, U4a-U4d, U5a-U5d, U6a-U6d, U7a-U7d, which may be implemented, for example, using five quad bilateral switch packages. Accordingly, a multi-line code violation generator 100 may be capable of simultaneously generating code violations on 20 DSL lines. However, it will be appreciated that a code violation generator according to embodiments of the invention may be configured to generate code violations on more or less than 20 DSL lines.

The multi-line code violation generator 100 includes a power input port 112 coupled to a full-wave rectifier 116 and a voltage regulator 118 configured to provide a stable DC voltage to the circuit. Accordingly, the multi-line code violation generator 100 may be operated using an AC or DC power source. The voltage regulator 118 may be implemented, for example, using an LM7812 3-terminal voltage regulator manufactured by Fairchild Semiconductor.

The circuit further includes a two-stage pulse generator circuit 120 including a first timer circuit U2a and a second timer circuit U2b. The first timer circuit U2a is configured to generate a series of pulses having a desired frequency as determined by a variable resistor R2 and a capacitor C3. The output of the first timer circuit U2a drives the second timer circuit U2b, which generates pulses having a pulse width determined by a variable resistor R6 and a capacitor C4. In some embodiments, the pulse generator circuit 120 is configured to generate pulses having a pulse period of about 1 to 2 seconds and a pulse width of about 100 μsec to about 1 msec. The pulse generator circuit 120 may be implemented, for example, using an LM556 dual timer manufactured by National Semiconductor.

One or more LED indicators, such as the LED indicators 122A, 122B, may be connected to the pulse generator circuit 120 to provide visual feedback of the period and/or pulse width of pulses generated by the pulse generator circuit 120.

The output of the pulse generator circuit 120 drives the control inputs of the bilateral switches U3a-U3d, U4a-U4d, U5a-U5d, U6a-U6d, U7a-U7d. The bilateral switches U3a-U3d, U4a-U4d, U5a-U5d, U6a-U6d, U7a-U7d each have a pair of I/O ports which are coupled to I/O ports P3a-P3d, P4a-P4d, P5a-P5d, P6a-P6d, P7a-P7d of the multi-line code violation generator 100 through coupling capacitors C3a-1, C3a-2, etc. Each port P3a-P3d, P4a-P4d, P5a-P5d, P6a-P6d, P7a-P7d of the multi-line code violation generator 100 may be coupled to a separate DSL line so that code violations may be simultaneously generated on multiple DSL lines.

Some embodiments of the invention may have close to 0 dBM insertion loss for DSL lines under test.

Embodiments of the present invention may be used in connection with various types of DSL systems including, without limitation, VDSL, ADSL, ADSL-2 and/or Bonded ADSL used for IPTV circuits.

It will be further appreciated that code violation generator circuits and/or methods according to embodiments of the invention may be used on other types of hardware besides twisted pair cabling. For example, some embodiments of the invention may be used to generate code violations on networks using coaxial cable connections, optical fiber connections, such as Integrated Fiber in the Loop (IFITL) connections; broadband power line (BPL) connections, IP Ethernet connections, and/or other types of connections. In the case of optical fiber connections, it may be possible to use embodiments of the invention to generate code violations by providing an optical regenerative circuit in the optical path and modulating the electrical signal in the optical regenerative circuit.

Furthermore, some embodiments of the invention can generate code violations for various different types of analog and/or digital signals. For example, embodiments of the invention may be used to generate code violations for video signals, voice signals, HF carrier signals, T-Carrier signals including T-1, T-1C, T-2 T-3 as well as all kinds of Digital Loop Carrier signals. A code violation generator apparatus and/or method according to the invention may operate without regard to the kind of framing and/or format used by the signals in the equipment under test, as no decoding and/or coding may be required to introduce coding violations.

Some embodiments of the invention provide the ability to create testing faults (code violations) on multiple facilities/channels/frequencies either selectively or simultaneously. Furthermore, some embodiments of the invention provide the ability to create testing faults (code violations) that include changes to the phase and/or amplitude of a communication signal on a line under test without requiring the generation of excessive noise that may cause crosstalk interference to other communication lines.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of generating coding errors on a communication line comprising:
   generating a communication signal;
   transmitting the communication signal on a communication line; and
   intentionally changing one of a phase and an amplitude of the communication signal on the communication line to thereby generate coding errors on the communication line;
   wherein the communication line comprises first and second parallel conductors, and wherein changing one of a phase and an amplitude of the communication signal carried on the communication line comprises capacitively coupling the first and second parallel conductors of the communication line; and
   wherein capacitively coupling the first and second parallel conductors of the communication line comprises providing a shunt connection including a capacitor and a switch between the first and second parallel conductors and selectively closing the switch to electrically connect a first terminal of the capacitor with the first parallel conductor and a second terminal of the capacitor with the second parallel conductor.

2. The method of claim 1, wherein the switch comprises a control input configured to controllably close or open the switch upon application of a control signal, and wherein selectively closing the switch comprises generating an oscillating signal and applying the oscillating signal as a control signal to the control input.

3. The method of claim 2, wherein generating the oscillating signal comprises generating a pulse train.

4. The method of claim 3, wherein the pulse train has a pulse period of about one second.

5. The method of claim 3, wherein a pulse in the pulse train has a pulse width of from about 100 μsec to about 1 msec.

6. The method of claim 1, wherein the communication line comprises one of a twisted pair communication line, a coaxial communication line, an Ethernet cable, and a broadband power line.

7. The method of claim 1, wherein the communication signal comprises one of an Ethernet signal, a DSL signal, a video signal, a voice signal, an HF carrier signal, and a T-carrier signal.

8. The method of claim 1, wherein the communication line comprises an wireless communication line and the communication signal comprises a wireless communication signal, the method further comprising:
    converting the wireless communication signal to an electrical signal;
    changing one of a phase and an amplitude of the electrical signal to provide an altered electrical signal; and
    converting the altered electrical signal into an altered wireless communication signal.

9. The method of claim 8, wherein the wireless communication signal comprises one of an RF communication signal and an optical communication signal.

10. The method of claim 1, wherein changing one of the phase and the amplitude of the communication signal on the communication line is performed without adding substantial external noise to the communication signal.

11. An apparatus for generating coding errors on a communication line including first and second parallel conductors, the apparatus comprising:
    an oscillator to generate a control signal; and
        a modulator to change one of a phase and an amplitude of a communication signal on the communication line in response to the control signal;
        wherein the modulator comprises a bilateral switch and a capacitor coupled between the first and second parallel conductors, and wherein the oscillator comprises a pulse generator configured to generate a pulse train as the control signal.

12. The apparatus of claim 11, wherein the capacitor comprises a first capacitor coupled to the first parallel conductor and the bilateral switch, the apparatus further comprising a second capacitor coupled between the bilateral switch and the second parallel conductor.

13. The apparatus of claim 12, wherein the first and second capacitors comprise a series capacitance selected to affect a frequency in the communication signal when the bilateral switch is closed.

14. The apparatus of claim 11, wherein the pulse generator comprises a first timing circuit to determine a frequency of the pulse train and a second timing circuit to determine a pulse width of the pulse train.

15. An apparatus for generating coding errors on a plurality of communication lines including first and second parallel conductors, the apparatus comprising:
    an oscillator to generate a control signal; and
        a plurality of modulators to change one of a phase and an amplitude of communication signals on respective ones of the plurality of communication lines in response to the control signal;
    wherein each of the modulators comprises a first capacitor coupled to the first parallel conductor of one of the plurality of communication lines and a bilateral switch, and a second capacitor coupled between the bilateral switch and the second parallel conductor of the one of the plurality of communication lines, and
    wherein the oscillator comprises a pulse generator coupled to a control input of the bilateral switch of each of the plurality of modulators.

* * * * *